US008480483B2

(12) United States Patent
Soussa et al.

(10) Patent No.: US 8,480,483 B2
(45) Date of Patent: Jul. 9, 2013

(54) DEVICE FOR MONITORING A VALIDATOR

(75) Inventors: Andre Soussa, North Ryde (AU); Geoffrey Allan Hughes, Hornsby Heights (AU)

(73) Assignee: Ecash Holdings Pty Ltd., New South Wales (AU)

( * ) Notice: Subject to any disclaimer, the term of this patent is extended or adjusted under 35 U.S.C. 154(b) by 1763 days.

(21) Appl. No.: 11/367,252

(22) Filed: Mar. 2, 2006

(65) Prior Publication Data

US 2006/0219515 A1 Oct. 5, 2006

(30) Foreign Application Priority Data

Mar. 3, 2005 (AU) ................................ 2005901019

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl.

USPC .................... 463/25; 463/29; 463/43; 463/47

(58) Field of Classification Search

USPC .......................................... 463/25, 29, 43, 47

See application file for complete search history.

(56) References Cited

U.S. PATENT DOCUMENTS

| | | | | |
|---|---|---|---|---|
| 5,442,568 | A * | 8/1995 | Ostendorf et al. | 700/236 |
| 6,484,938 | B1 * | 11/2002 | Shepherd et al. | 235/381 |
| 7,004,466 | B2 * | 2/2006 | Gauselmann | 273/139 |
| 2002/0025850 | A1 * | 2/2002 | Hafezi | 463/29 |
| 2002/0162775 | A1 * | 11/2002 | Saltsov et al. | 209/534 |
| 2003/0064801 | A1 * | 4/2003 | Breckner et al. | 463/30 |
| 2004/0002379 | A1 * | 1/2004 | Parrott et al. | 463/29 |
| 2004/0050651 | A1 * | 3/2004 | Heidel | 194/217 |

FOREIGN PATENT DOCUMENTS

| | | | |
|---|---|---|---|
| AU | 2006100500 | A4 | 7/2006 |
| WO | WO 99/03078 | A1 | 1/1999 |
| WO | WO 2004/111954 | A1 | 12/2004 |

* cited by examiner

*Primary Examiner* — Omkar Deodhar
*Assistant Examiner* — Adetokunbo O Torimiro
(74) *Attorney, Agent, or Firm* — Morgan Lewis & Bockius LLP; Richard F. Trecartin, Esq.

(57) ABSTRACT

A device (1) monitors a validator (2) used by a terminal, this terminal taking the form of an Electronic Gaming Machine (EGM) (3) having a central control unit (CCU) (4). Device (1) includes a first interface (5) for connection to validator (2), and a second interface (6) for connection to CCU (4). Device (1) also includes a processor (7) for passing signals (not shown) between interface (5) and interface (6), and compiling information (not shown) in response to the passed signals. Device (1) further includes a port (8) for communicating the information to a server (9) external of EGM (3).

6 Claims, 11 Drawing Sheets

DEVICE FOR MONITORING A VALIDATOR

CROSS REFERENCES TO RELATED APPLICATIONS

This application claims the benefit of Australian Provisional Application No. 2005901019 filed Mar. 3, 2005, the entire contents of which is incorporated herein by reference

FIELD OF THE INVENTION

The present invention relates to a device for monitoring a validator, and more specifically a device for monitoring a validator used by a terminal having a central control unit.

The invention has been developed primarily for providing external access to information about the operation of a bill validator, and in particular for situations where the validator is used in an electronic gaming machine (EGM). Although the invention is described hereinafter with reference to those applications, it will be appreciated that the invention is not limited to those particular fields of use and is applicable in a broader context.

BACKGROUND OF THE INVENTION

Terminals that make use of validators are known. Common examples include EGMs, vending machines, payment processing terminals, ticket acceptance machines and automatic teller machines that offer a cash-deposit facility. In each of these terminals, a user inserts a token into the validator to access a functionality of the terminal. In many scenarios the token is currency in bill form, although in some circumstances alternate tokens are used, such as tickets or coupons.

Many known terminals have a central control unit that controls the terminal's functionality and communicates with peripheral devices. Where such a terminal uses a validator, the central control unit is in communication with the validator to coordinate the granting of functionalities. For example, in many known EGMs, the validator receives a currency bill of a certain denomination. The validator validates the bill to ensure that it is acceptable under predetermined protocols and, assuming the note is acceptable, communicates a signal to the central control unit indicative of a note being accepted, and indicative of the denomination of the note. In response, the EGM increases the available playing credit by an increment corresponding to the denomination of the accepted note.

It is not unusual for known validators to malfunction. For example, validators often repeatedly reject acceptable currency because of a mechanical fault. Given that the commercial interests of an owner of a terminal using a faulty validator can be adversely affected, it is preferable to ensure validators function in line with predetermined standards. As such, a desire arises to monitor the operation of validators.

In many known terminals, particularly EGMs, it is difficult to access information about of the operation of the validator. Often, accessing such information requires manual intervention, and temporarily rendering the terminal out of service. This is a time-consuming process, and will commonly result in reduced revenue whilst the terminal is out of service. If such an intervention is not made regularly, there is a risk of a faulty validator causing problems and harming the commercial interests of the terminal's owner.

In this specification, the term validator refers to any electromechanical/optoelectrical device used to determine whether a provided token is of a certain standard, and communicate the result of the determination to a secondary source. In some cases, the secondary source includes the central control unit of a terminal.

SUMMARY OF THE INVENTION

It is an object of the present invention to overcome or ameliorate at least one of the disadvantages of the prior art, or to provide a useful alternative.

According to a first aspect of the invention, there is provided a device for monitoring a validator used by a terminal having a central control unit, the device including:

a first interface for connection to the validator;

a second interface for connection to the central control unit;

a processor for:

- passing signals between the first interface and the second interface; and
- compiling information in response to the passed signals; and a port for communicating the information externally of the terminal.

Preferably, the first interface receives a downstream signal from the validator and the second interface transmits the downstream signal to the central control unit. More preferably, the first interface includes a plurality of downstream inputs for receiving downstream signals from the validator, and the second interface includes a complimentary plurality of downstream outputs for transmitting the respective downstream signals to the central control unit. In some embodiments, a downstream signal includes any one or more of the following:

a validator identifier;

a note acceptance identifier;

a note rejection identifier;

a rejection type identifier;

a note denomination identifier;

a note identifier; and a validator error identifier.

Preferably, the second interface receives an upstream signal from the central control unit and the first interface transmits the upstream signal to the validator. More preferably the second interface includes a plurality of upstream inputs for receiving upstream signals from the central control unit, and the first interface includes a complimentary plurality of upstream outputs for transmitting the respective upstream signals to the validator. In some embodiments the upstream signal includes a power supply.

Preferably embodiment, the first and second interfaces are adapted to serially connect the device intermediate the validator and the terminal.

In some embodiments, the device includes one or more additional interfaces for communicating with the central control unit.

Preferably, if a signal is received by the first interface, a substantially identical signal is transmitted by the second interface. More preferably, if a signal is received by the second interface; a substantially identical signal is transmitted by first second interface.

In some embodiments, the processor includes a storage system for storing the compiled information. Preferably, the storage system includes a database. More preferably, the port facilitates external querying of the database.

Preferably, the terminal includes any one or more of the following:

an electronic gaming machine;

a vending machine;

a payment processing terminal; and a cashless gaming administration kiosk.

In some embodiments, the first interface is responsive to the processor for interrogating the validator. Preferably, the interface is only responsive to the processor during predetermined periods. More preferably, the predetermined periods include periods when the validator and terminal are not in communication.

Compiled information is preferably indicative of any one or more of the following:

a digital representation of a transmitted signal;

an identifier indicative of the device;

an identifier indicative of the terminal;

an identifier indicative of the validator; and a tag indicative of the time a signal was monitored.

In some embodiments, compiling information in response to the passed signals includes buffering the transmitted signals.

Preferably, the port provides a server with access to the compiled information. Also preferably, the port provides the server with access to the functionality of the processor. Still preferably, the port provides the server with access to the passed signals.

According to a second aspect of the invention, there is provided a device for monitoring a validator used by a terminal having a central control unit, the device including:

a first interface for connection to the validator;

a processor for:

intercepting signals between the validator and the central control unit; and compiling information in response to the intercepted signals; and a port for communicating the information externally of the terminal.

According to a third aspect of the invention, there is provided a device for obtaining information about a validator used by a terminal, the device including:

a first communication interface for receiving a signal from the validator;

a processor for buffering the received signal;

a second communication interface for transmitting the signal to the terminal; and a third communication interface for communicating the buffered signal externally of the terminal.

According to a further aspect of the invention, there is provided a method for providing information about a validator used by a terminal, the validator enabled for communication with the terminal through a communication line, the method including:

monitoring signals in the communication line;

compiling information indicative of monitored signals; and obtaining the information indicative of the monitored signal.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENTS

Figure 1:
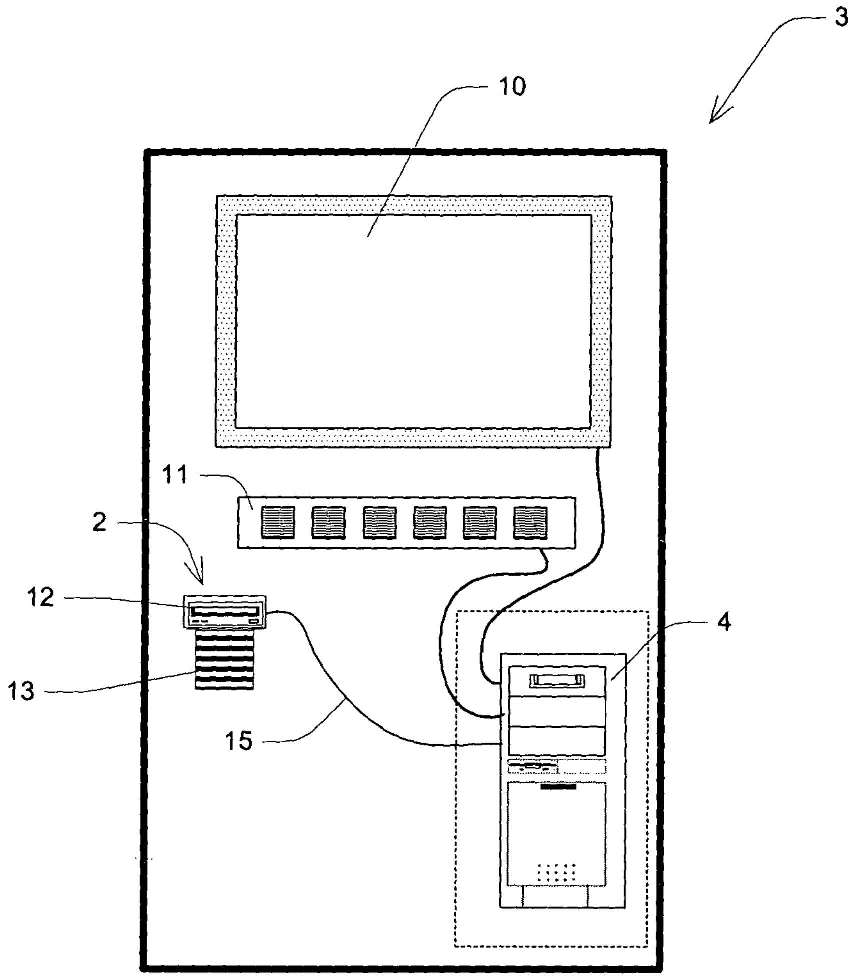
FIG. 1 is a schematic representation of a prior art terminal.

Referring to the drawings, several embodiments of the invention are illustrated. It will be appreciated that, in the different figures, corresponding features have been denoted by corresponding reference numerals.

Figure 2:
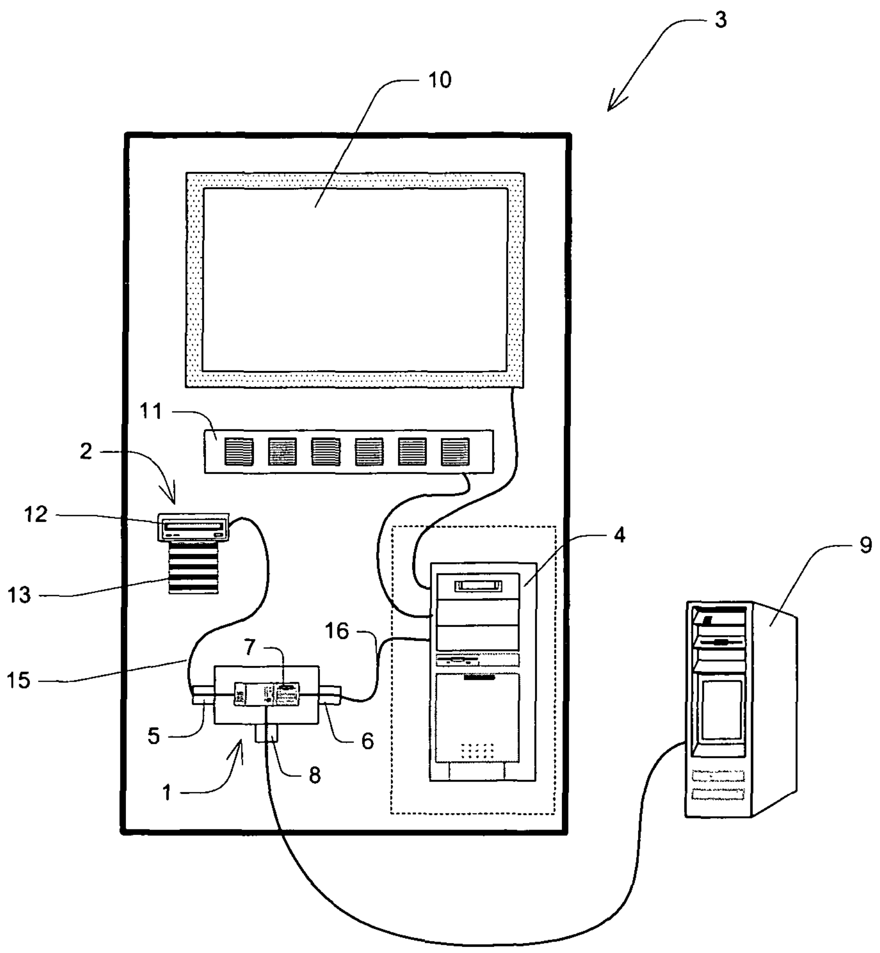
FIG. 2 is a schematic representation of a device according to the invention installed in the terminal of FIG. 1.

Referring initially to FIG. 2, there is provided a device 1 for monitoring a validator 2 used by a terminal, in the form of an EGM 3 having a central control unit (CCU) 4. Device 1 includes a first interface 5 for connection to validator 2, and a second interface 6 for connection to CCU 4. Device 1 also includes a processor 7 for passing signals (not shown) between interface 5 and interface 6, and compiling information (not shown) in response to the passed signals. Device 1 further includes a port 8 for communicating the information to a server 9 external of EGM 3.

In some embodiments, server 9 is used solely for communicating with device 1. In other embodiments, server 9 is part of a pre-existing network for monitoring EGMs such as EGM 3.

Alternate embodiments make use of forms of terminal other than EGM 3. In some embodiments, these include vending machines, payment processing terminals, cashless gaming administration kiosks, ticket acceptance machines and automatic teller machines that offer a cash-deposit facility. It will be appreciated that device 1 is conveniently implemented in substantially any terminal having a validator and a central control unit for communication with that validator.

In the present embodiment, validator 2 is configured to receive and validate currency notes. Suitable validators for receiving and validating currency notes in an EGM will be known to persons skilled in the art, and include validators such as the GPT Argus G3 bill validator and the GPT G2 bill validator. In alternate embodiments validator 2 is configured to receive and validate alternate forms of token, such as coupons or tickets. Generally speaking, the type and function of validator is directly related to the type and purpose of terminal in which it is to be used.

EGM 3 includes a visual display unit 10 and a keypad 11, each of which is connected to CCU 4. These serve a primary purpose of facilitating user interaction with EGM 3 for the purpose of gaming. That is, in typical use, a player views images and animations indicative of a game on display 10, and controls game functions using buttons on keypad 11. Display 10 and keypad 11 serve a secondary purpose of facilitating diagnostic interrogation of EGM 3. That is, they collectively provide a user interface that allows a user to obtain diagnostic information about EGM 3. This diagnostic information includes game information, such as the number of games played and associated result statistics, and machine information, such as hardware error reports. Among the machine information is information about the operation of validator 2.

Given that a common keypad and display are used for both gameplay and diagnostic purposes, there is typically an inherent need to have mutually exclusive gameplay and diagnostic modes. When EGM 3 is in gameplay mode such that a player is able to use EGM 3 for the purpose of gaming, the diagnostic mode for obtaining game and machine information is not available. Likewise, when EGM 3 is in diagnostic mode, the gaming mode is disabled. The latter of these scenarios is more concerning from a commercial perspective. EGMs are typically viewed as an income source, and necessitating temporary periods of inactivity results in a likelihood of lost income.

EGM 3 is configured to by default operate in the gaming mode. To progress from gaming mode to diagnostic mode an operator key is inserted into a complimentary keyhole, and this key is turned from a gaming mode configuration to a diagnostic mode configuration. EGM 3 remains in diagnostic mode until this key is returned to the gaming mode configuration.

Due to the commercial implications of disabling gaming, it is typically preferred to only access diagnostic information at times when EGM 3 is not available for gaming due to other factors—such as at times when gaming is not permitted due to legislation or zoning regulations. This often results in insufficient diagnostic monitoring and more serious problems developing.

Generally speaking, device 1 allows diagnostic information regarding validator 2 to be obtained independent of whether EGM 3 is in the gaming or diagnostic mode. Importantly, diagnostic information regarding validator 2 is able to be obtained even whilst a player is engaged with gaming through EGM 3, and substantially without affecting the gaming experience of the player.

When validator 2 receives a suitably sized item in aperture 12, it validates the item to determine whether it is an acceptable currency note. As a result of the determination, validator 2 provides a signal to CCU 4. In the present embodiment, this signal is typically indicative of one of the following:

- A note acceptance identifier, informing CCU 4 that a note has been accepted, along with a note denomination identifier, which provides CCU 4 with data indicative of the denomination of the note. In response to such as signal, the CCU grants a player with credit corresponding to the denomination of note inserted.
- A note rejection identifier, informing CCU 4 that a note has been rejected, along with a rejection type identifier, providing CCU 4 with a reason—selected from a predetermined list—for which the note has been rejected.

The signal is often indicative of other information. For example: a note identifier—such as a serial number read off the note—to aid in the identification of notes at a later stage.

If a currency note is accepted, it is retained in a stacker 13. Stacker 13 is emptied periodically. In some instances, particularly during periods of high activity, stacker 13 requires more regular emptying, otherwise operational difficulties are experienced, at times rendering validator 2 out of order. However, without accessing validator diagnostic information, it is difficult to know when this is the case.

Validator 1 also sends further signals to CCU 4 in response to other stimuli. Some stimuli include an interrogation signal provided by CCU 4. For example, in some embodiments, validator 2 has a unique identifier for security purposes. -In such embodiments, CCU 4 sends a signal to validator 2 requesting that a validator identifier be provided, and validator 2 responds with a signal indicative of its unique validator identifier. Other stimuli include internal events in validator 2. For example, where validator 2 experiences a mechanical fault, it sends a signal indicative of a validator error identifier to CCU 4. Other internal events include stacker 13 reaching full capacity or being removed.

Referring to FIG. 1, in the absence of device 1 validator 2 transmits downstream signals through to CCU 4, and CCU 4 transmits upstream signals to validator 2. These signals are transmitted though a cable loom 15. In the present embodiment the loom interfaces by a RS232, however in other embodiments alternate interfaces are used, such as USB, RS485 or TCP/IP. The interface used is dependant on the specific terminal and validator, and no single particular interface should be regarded as limiting to the present disclosure.

Referring to FIG. 2, device 1 is serially connected intermediate validator 2 and CCU 4. In the present embodiment, the RS232 of loom 15 that is otherwise connected to CCU 4 is instead connected to interface 5. A second loom 16, which is effectively operatively identical to loom 15, is then connected from interface 6 to CCU 4. It will be appreciated that this serially connects device 1. In the present embodiment, interfaces 5 and 6 are appropriate for interfacing with RS232 connectors. In some embodiments, interfaces 5 and 6 are not so configured, and as such an adaptor is used. A person skilled in the art will be able to recognise a suitable adaptor.

In some embodiments, loom 15 is split into two sections and further RS232 connectors attached appropriately. In such an embodiment, one section is used to take the place of loom 15, the other to take the place of loom 16. In certain embodiments, device 1 is integrated into validator 2.

When device 1 is installed, and validator 2 communicates with CCU 4, either or both of the following occur:

- Interface 5 receives a downstream signal from the validator and interface 6 transmits the downstream signal to the central control unit.
- Interface 6 receives an upstream signal from the central control unit and interface 5 transmits the upstream signal to the validator.

In the present embodiment, if a signal is received by the first interface,—a substantially identical signal is transmitted by the second interface. Likewise, if a signal is received by the second interface, a substantially identical signal is transmitted by the first interface. As a result, the presence of device 1 is transparent insofar as CCU 4 is concerned.

Given that RS232 connectors are used, interface 5 effectively includes a plurality of downstream inputs for receiving downstream signals from validator 2, whilst interface 6 includes a complimentary plurality of downstream outputs for transmitting the respective downstream signals to CCU 4. Likewise, interface 6 includes a plurality of upstream inputs for receiving upstream signals from CCU 4, whilst interface 5 includes a complimentary plurality of upstream outputs for transmitting the respective upstream signals to validator 2. In the context of RS232 connectors, this means that interface 6 provides an RS232 connector that is substantially physically and functionally identical to the RS232 connector inserted to interface 5, and vice versa.

Downstream signals are typically indicative of includes any one or more of the following:

A validator identifier.

A note acceptance identifier.

A note rejection identifier.

A rejection type identifier.

A note denomination identifier.

A note identifier.

A validator operational status identifier.

A validator error identifier.

In other embodiments alternate downstream signals are present. It will be appreciated that the designated functionality of validator 2, along with the interaction protocols employed by CCU 4, will determine the types of downstream signals that are sent.

In the present embodiment, the upstream signal includes a power supply. The power supply is provided by CCU 4 and travels through looms 15 and 16. This power supply is traditionally used to power validator 2, however in the present embodiment, it is also used to power device 1. It will be appreciated that this facilitates convenient installation of device 1 into terminal 3, as less wiring is required. Indeed, in the present embodiment, installation of device 2 is a simple as connecting looms 15 and 16 as described above and suitably affixing device 1 to a location inside EGM 3. In other embodiments alternate power supply arrangements are used.

In one embodiment, the power supply is provided by a downstream signal. This is possible in situations where validator 2 provides an output voltage, which is known to be the case with some validators. For example, an Argus G3 validator provides a 5V output signal. A typical monitor, such as device 1, requires about 3V, and 5V is easily stepped down using a regulator. A benefit of his approach is that the device functions only when the validator has power.

Where power is obtained from CCU 4, it is typically at 24V, which requires a more substantial regulator impact, and this results in a larger amount of heat dissipation.

It is typically advantageous to securely mount device 1 within the body of EGM 3, for example by way of a harness. Other techniques for securely mounting device 1 are considered, such as double-sided tape or a similar adhesive. That being said, in some embodiments device 1 is positioned inside EGM 3 without any specific attachment aid.

Figure 3:
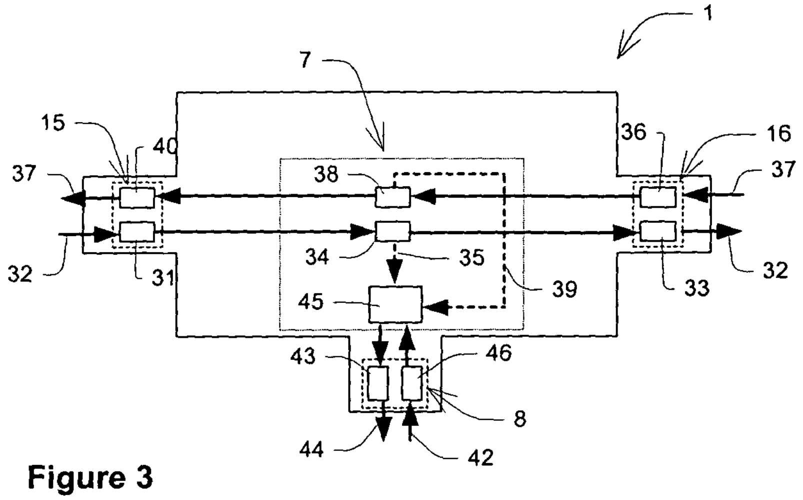
FIG. 3 is a more detailed schematic representation of the device of FIG. 2.

FIG. 3 schematically illustrates device 1 in greater detail. It is appreciated that the various specific signals are passed through device 1, such as power supply—are not illustrated in FIG. 3 for the sake of simplicity.

Interface 15 includes a receiving Rx component 31 for receiving a downstream signal 32 from validator 2. Processor 7 passes signal 32 to a transmitting Tx component 33 in interface 16. Signal 32 is then transmitted to CCU 4 by Tx component 33. During the passing, signal 32 is buffered by an Rx buffer 34 in processor 7. A buffered signal 35 is sent from Rx buffer 34 to a storage device 45. Storage device 45 receives buffered signal 35, compiles information in response to the buffered signal, and stores that information in a storage system.

Similarly, interface 16 includes an Rx component 36 for receiving an upstream signal 37 from CCU 4. Processor 7 passes signal 37 to a Tx component 40 in interface 15. Signal 37 is then transmitted to CCU 4 by Tx component 40. During the passing, signal 37 is buffered by an Rx buffer 38 in processor 7. A buffered signal 39 is sent from Rx buffer 38 to storage device 45. As was the case with the downstream signal, storage device 45 receives buffered signal 39, compiles information in response to buffered signal 39, and stores that information.

It will be appreciated that, in the present embodiment, a Tx component is a component that interfaces with pin #3 on a standard RS232 connector, and likewise an Rx component interfaces with pin #2 on a standard RS232 connector.

In the present embodiment, compiling information in response to the passed signals includes buffering the transmitted signals and the compiled information is a digital representation of a transmitted signal. In addition, the information is subjected to further processing during the compiling process. For example: appending one or more additional identifier to portions of data in the digital representation. This appended identifier typically allows the data to be tracked to its source. Appended identifiers are typically indicative of the specific device 1, validator 2, and terminal 3, as well as the time at which the signal was monitored.

Processor 7 includes a storage system for storing the compiled information. Suitable storage systems will be known to those skilled in the art, and include hard drives, flash cards, recordable media, and the like.

Port 8 provides server 9 with access to the compiled information. Server 9 is subsequently able to use the compiled information for the purposes of monitoring validator operations, validator statistics, terminal cash intake, the contents of stacker 12, and other such variables. In some embodiments server 9 obtains the information in real time. In other embodiments, server 9 obtains the information periodically.

In the present embodiment port 8 is an Ethernet port, which facilitates connection of device 1 to an Ethernet based network. In other embodiments alternate ports are used, including USB ports, serial ports, wireless networking adaptors, or other ports that allow one or two way communication between devices.

Port 8 effectively includes a receiver 46 for receiving a signal 42 from server 9, and a transmitter 43 for transmitting to server 9 via a signal 44. Those skilled in the art will recognise how such components are incorporated into standard Ethernet connections.

In further embodiments, port 8 provides server 9 with direct access to the passed signals. As such, server 9 is able to receive the signals transmitted by either or both of validator 2 or CCU 4.

In the present embodiment, interface 5 is responsive to processor 7 for interrogating validator 2. This is primarily used to obtain specific information from validator 2 that is otherwise not communicated to CCU 4. Interface 5 is only responsive to processor 5 during predetermined periods, being periods when the interrogation will not interfere with communications between validator 2 and CCU 4. As such, the predetermined periods include periods when the validator and terminal are not in communication, such as immediately following actuation of EGM 3. In some embodiments, interrogation is used to access information that is not available to CCU 4.

The benefit of interrogation is that it facilities the accessing of additional functionalities of validator 2. In some embodiments, validator 3 is specifically designed to interact with device 1, and includes functionalities that are only available in response to a signal from device 1. In other embodiments, additional functionalities include functionalities that validator 2 is capable of performing, but that it does not perform due to the nature of the interaction with CCU 4.

In some embodiments where port 8 provides server 9 with access to the functionality of processor 7, interrogation of validator 2 is conducted in response to a signal provided by server 9.

In some embodiments, device 1 includes one or more additional interfaces for communicating with CCU 4 to monitor various other processes of EGM 3. Such processes include the opening of doors, powering down of the terminal, removal of peripherals, machine errors, and the like.

Figure 4:
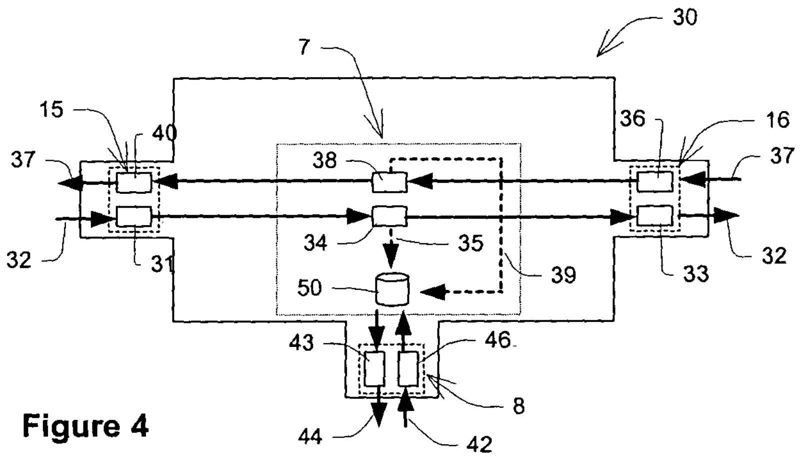
FIG. 4 is a schematic representation of a device according to an alternate embodiment of the invention.

FIG. 4 illustrates an alternate embodiment, in the form of device 30. The storage system 7 of device 30 includes a database 50 for storing the compiled information. Appropriate databases will be known to persons skilled in the art, and typically lightweight rudimentary data loggers are sufficient. In the embodiment of FIG. 4, database 50 includes the necessary functionality to compile information prior to storage. In alternate embodiments a further processing unit in communication with database 50 provides this functionality. Often, in such embodiments, port 8 facilitates querying of the database by server 9. It will be appreciated that this allows server 9 to access the desired information more effectively. For example, where each portion of information includes a tag indicative of the time a signal was monitored, server 9 might query database 50 to obtain information indicative of signals received during a predetermined time period.

In some embodiments, port 8 provides server 9 with access to the functionality of processor 7. In some such embodiments, server 9 is used to modify the method of compiling information, clear the contents of the storage system, perform diagnostic checks on the device 1, update firmware, or download control software to the processor.

Figure 5:
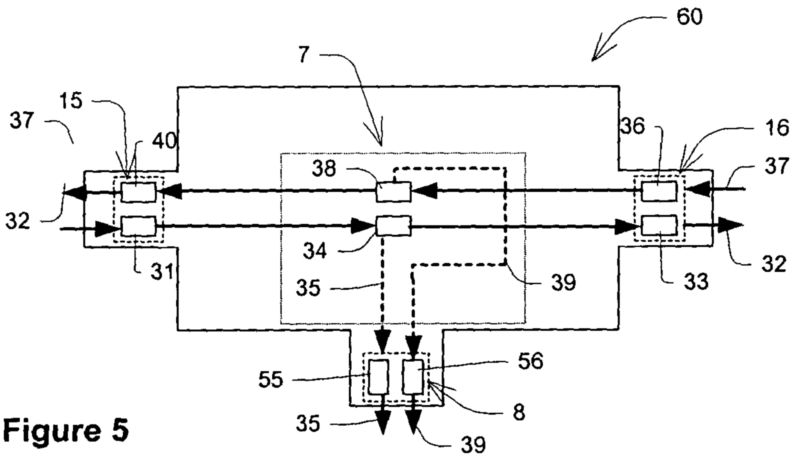
FIG. 5 is a schematic representation of a device according to a further alternate embodiment of the invention.

FIG. 5 illustrates an alternate embodiment, in the form of device 60. Port 8 of device 60 includes a pair of Tx components 55 and 56 for transmitting buffered signals 35 and 39 respectively. As such, in this embodiment, compiling information is limited to buffering received upstream and downstream signals and making these available to a user of port 8. In such an embodiment, it is common to use external processing equipment to process buffered signals 35 and 39 for increased utility.

Figure 6:
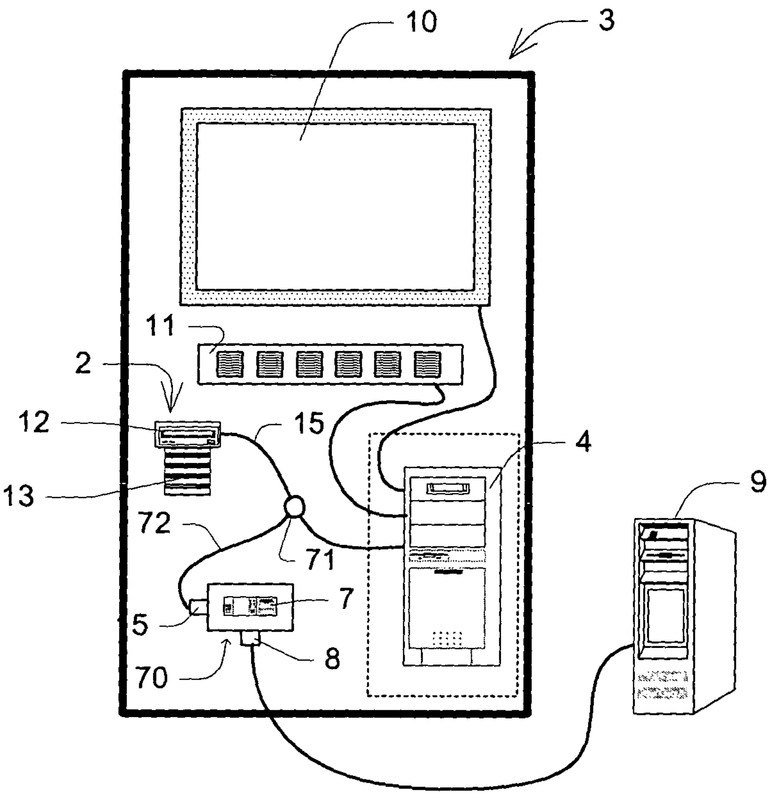
FIG. 6 is a schematic representation of an alternative device according to the invention installed in the terminal of FIG. 1.
Figure 7:
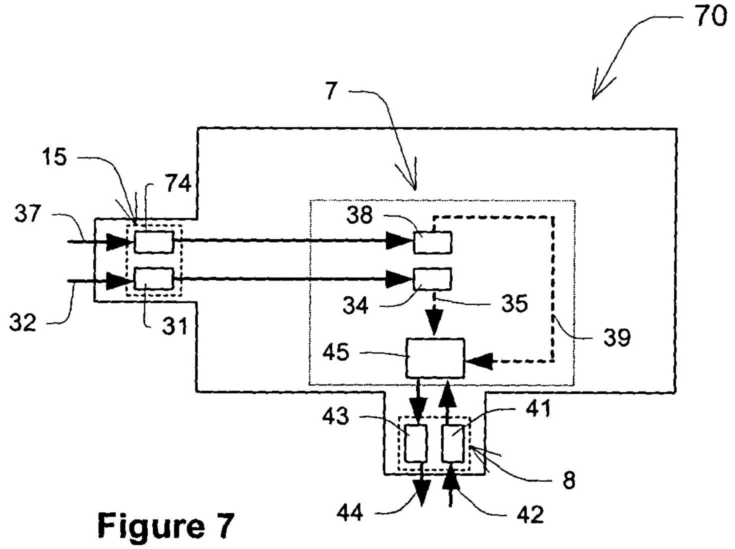
FIG. 7 is a more detailed schematic representation of the device of FIG. 6.

FIGS. 6 and 7 illustrate a further alternate embodiment of the invention, in the form of device 70. Device 70 includes an interface 15 for connection to validator 2, and a processor 7 for intercepting signals between validator 2 and the CCU 4. Processor 7 is also used for information in response to the intercepted signals. Device 70 further includes a port for communicating the information to server 9.

Unlike the above embodiments, device 70 is not serially connected within loom 15. Instead, a signal splitter 71 is installed in loom 15 such that signals in loom 15 are sent both to their respective intended destination and to device 70. In this embodiment, the presence of signal splitter 71 allows processor 7 to intercept signals in loom 15. Device 70 receives the signals through interface 15, and more specifically through Rx components 31 and 74. It will be appreciated that device 70 is not enabled for transmitting signals to either or both of validator 2 or CCU 4. In other embodiments it is so enabled by providing an appropriate splitter 71, additional Rx components, and suitable functionality in processor 7. Achieving this will not be problematic for a person skilled in the art.

Figure 8:
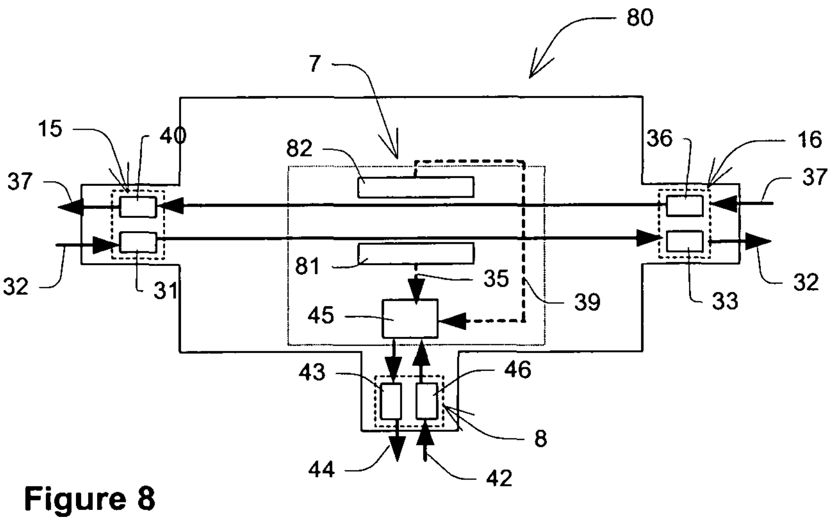
FIG. 8 is a schematic representation of a device according to a further alternate embodiment of the invention.

FIG. 8 illustrates an alternate embodiment of the invention in the form of a device 80. A primary impetus for an embodiment along the lines of device 80 is avoiding latency between receiving and transmitting signals between validator 2 and CCU 4. In this embodiment, listening modules 81 and 82 are used to monitor signals 32 and 37 respectively. Modules 81 and 82 are merely passive listening devices, and do not buffer or otherwise delay signals 32 and 37. As such, signals 32 and 37 pass through device 80 substantially without modification or delay. Suitable listening modules will be known to persons skilled in the art, and in some embodiments include high impedance signal receptors.

Figure 9:
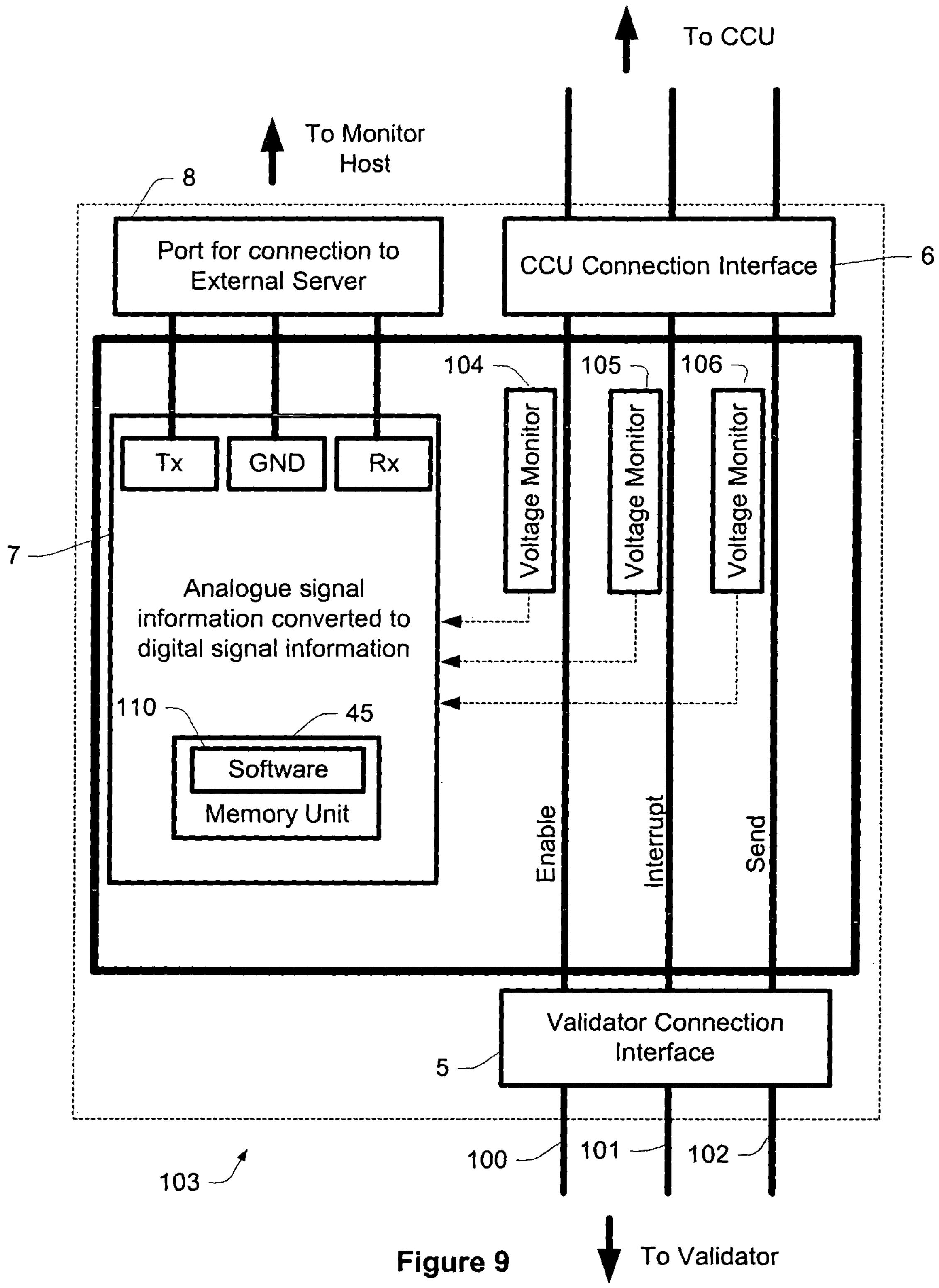
FIG. 9 is a schematic representation of a device according to a further alternate embodiment of the invention.
Figure 10:
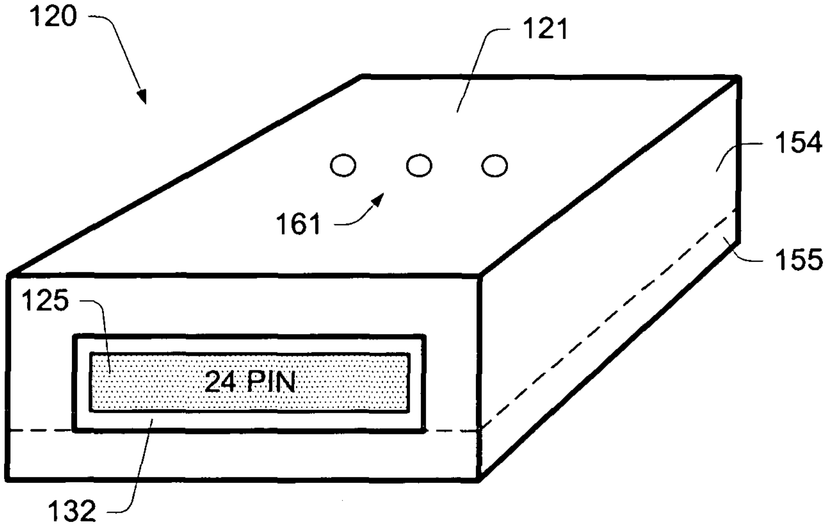
FIG. 10 is a front perspective view of a device according to a further alternate embodiment of the invention.
Figure 11:
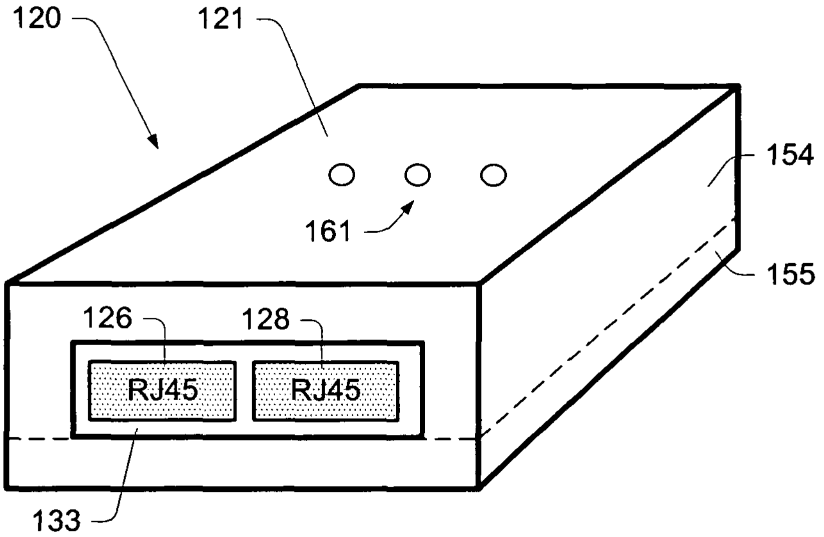
FIG. 11 is a rear perspective view of the device of FIG. 10.
Figure 12:
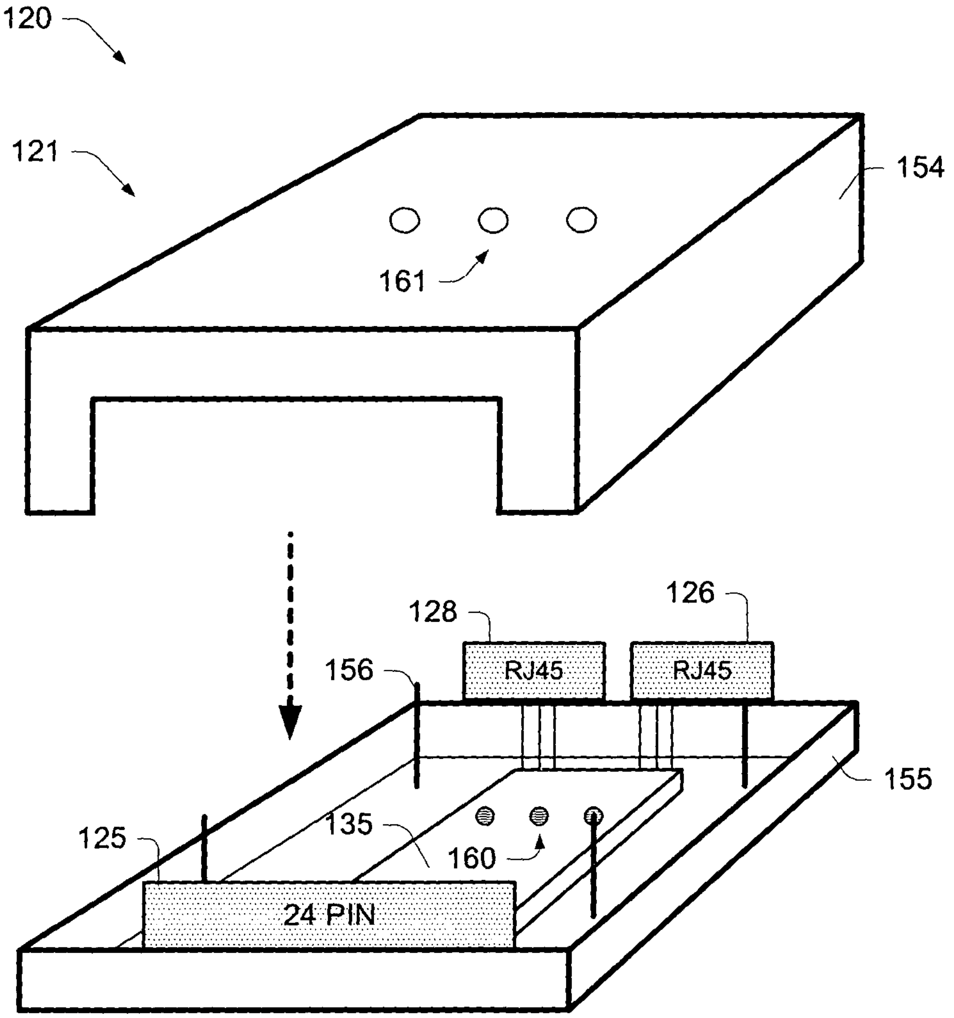
FIG. 12 is a view similar to FIG. 10, showing the device in a open configuration.

Embodiments along the lines of FIG. 8 are particularly useful in situations where validator 2 communicates with CCU 4 by way of analogue signals. A specific example is provided in FIG. 9. In the example of FIG. 9, validator 2 communicates with CCU 4 by an analogue signalling protocol known as VFM. In a broad sense, there are a plurality signal lines for carrying respective variable voltages. These typically include an enable line 100 for carrying an enable signal, an interrupt line 101 for carrying an interrupt signal, and a send line 102 for carrying data signals, these typically being pulsed signals indicative of data. In some embodiments a digital serial signal operates in parallel to the analogue signals via an RS232.

Each of the analogue signals is variable between a high voltage and a low voltage, typically between +/−12V, or 0V to 24V. The magnitude of voltage and pulse characteristics are indicative of specific signal purposes and meanings. Further, the interrupt signal often defines a time window for data signals. In a hypothetical example, a 5V interrupt signal provided by validator 2 indicates that any data signal received in the following one-second period relates to the denomination of a stacked bill. For the sake of example, perhaps five pulses in the data line in that one-second period indicates that a five-dollar note has been stacked.

In the case of the enable signal, the varying voltage defines an "enable" mode often provides sufficient voltage to enable validator 2, and a disable mode that provides no voltage or insufficient voltage. The net result is that validator 2 is operational only when the enable signal defines the enable mode. In other cases the enable signal is used similarly, but does not provide operational voltage.

Generally speaking, VFM involves a precise time-based handshake protocol to ensure reliable communication. The presence of a breakage or buffer in the communication lines would affect timing, and as a result signals would be ignored and data not effectively received. To this end, a monitoring device 103 makes use of passive listening modules. More specifically, voltage monitors 104, 105 and 106 are provided for respectively monitoring voltage in each of lines 100, 101 and 102. In some embodiments monitor 103 is not required.

The voltage monitors provide respective signals indicative of voltages in their respective lines to a software application 110 maintained on storage device 45 and executable through processor 7. This software application maintains data indicative of the VFM signalling protocol, and uses this data to interpret signals obtained from modules 104, 105 and 106 to provide a useful output signal 44. This typically involves extracting important data and placing it in a form suitable for an external device to receive. As mentioned above, the important data is typically the denominations of stacked notes, and rejection reasons. In the present embodiment, data indicative of the analogue signals is processed into a useful digital format. It is then available via port 8, which in this case is a RS232 connector.

Figure 13:
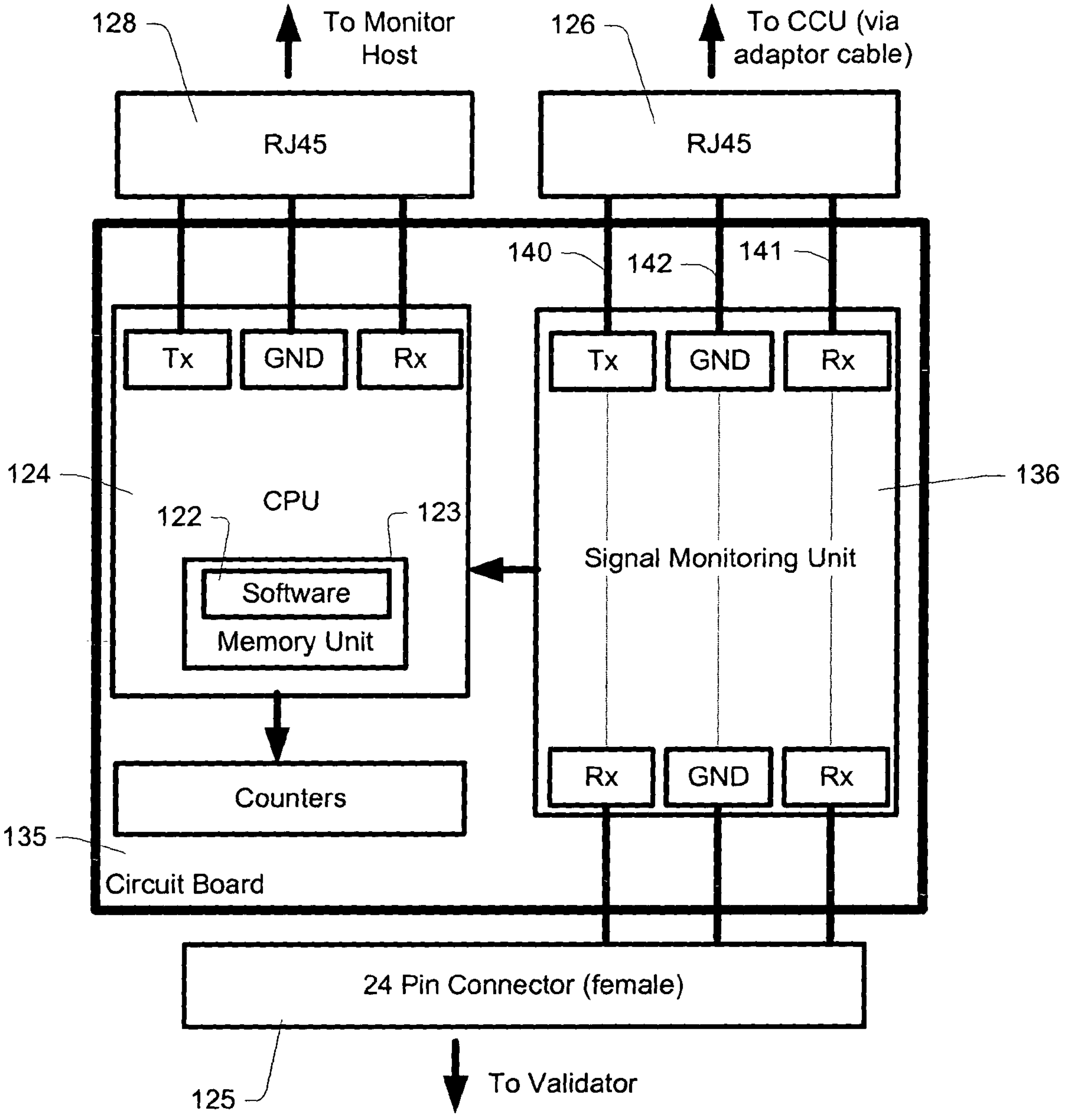
FIG. 13 is a schematic representation of a circuit board from the device of FIG. 10.
Figure 14:
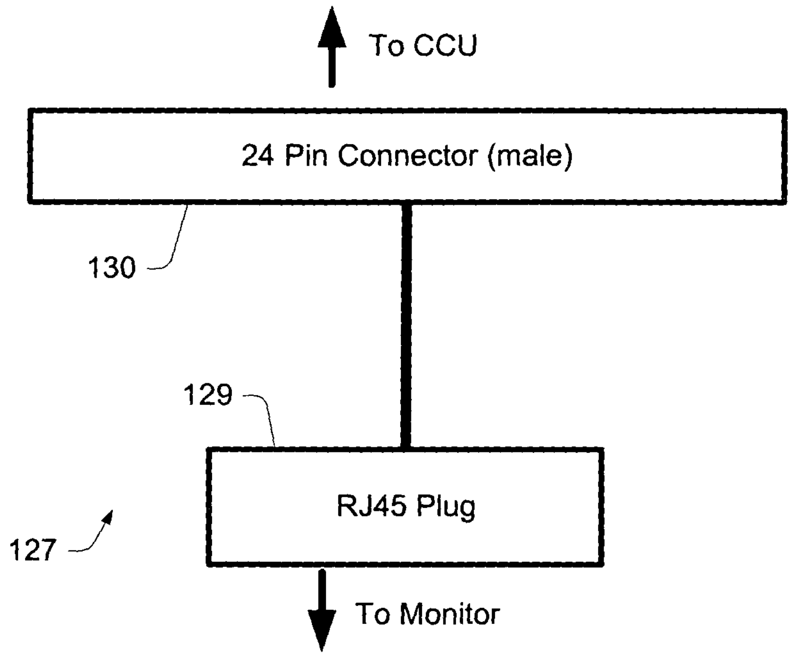
FIG. 14 is a schematic representation of an adaptor for use with the device of FIG. 10.

FIGS. 10 to 15 illustrate an embodiment of the invention in the form of device 120. In overview, device 120 is maintained in a tamper evident casing 121, and includes tamper evident software 122 on a memory unit 123 in combination with a CPU 124. CPU 124 provides three major outputs: a female 24-pin connector 125 for receiving a cable from validator 2, an RJ45 connector 126 for receiving an adaptor 127, and another RJ45 for connector 128 for allowing connection to an external host, such as server 9. Adaptor 127 includes an RJ45 adaptor 129 at one end for connection to device 120, and a male 24-pin connector 130 at the other end, as shown in FIG. 14. A cable connects connector 130 to CCU 4 in the same manner as validator 2 would connect to CCU 4 in absence of device 120. Connector 125 is available through an aperture 132 in casing 121, whilst connectors 126 and 128 are available through an aperture 133.

A circuit board 135 is maintained within casing 121 for providing the general functionality of device 120. The circuit board, as schematically illustrated in FIG. 13, includes memory unit 123 and CPU 124. A signal monitoring unit 136 receives and re-transmits upstream and downstream signals between the validator and CCU. Software 121 analyses these signals to obtain important data.

This data is made available to an external host, such as server 9. Further, counters 138 are provided on circuit board 135 for recording data. For example: a counter that increases by one each time a five-dollar note is stacked, a counter that increases by one each time a bill is rejected for an optics fault, a counter that increases by the denominational value each note stacked, and so on. These counters are typically digital, however in some embodiments electromechanical counters are used. Upon analysis of the signals in software 121, the counters are updated where appropriate.

The present embodiment is implemented with a validator 2 that uses RS232 communications. In particular, there is a downstream transmission line 140, an upstream transmission line 141, and a common ground 142. Serial signals are communicated along these lines. For the sake of example, validator 2 operates in a polling mode. That is, a "status check" signal is continuously repeatedly provided by CCU 4. In response to this "status check" signal, validator 2 provides a signal indicative of its current status. This process typically occurs multiple times each second. At most times, the validator provides a "ready to receive" signal. However, when a note is inserted a number of other signals begin to flow. For example: note received, note in escrow, note under analysis, note value being determined, and so on. It will be appreciated that there are a very large number of upstream and downstream signals. It will further be appreciated that most of these signals are of limited interest. Software 121 is enabled to extract only signals of interest, and further to extract only the interesting portions of data. The interesting data is typically:

- An event where a note has been stacked, and the value of that note.
- An event where a note has been rejected, and the reason for rejection.

There is other interesting data that is also extracted, such as startup data and other diagnostic reporting. For example, a signal indicating that various token recognition protocols are being activated, a signal indicative of an inactive validator, or a signal indicating that the stacker is full.

Software 121 includes data indicative of the signalling protocols for validator 2 to facilitate the extraction of important information. Typically, a serial signal communicated either upstream or downstream is in a form such as:

STx CMD LGTH (Data1, Data2, . . . , DataN) CRC ETx

STX and ETX respectively mark the start and end of a signal. LGTH indicates the signal length, typically by reference to the number of bytes. CRC is a redundancy check to ensure transmission reliability. CMD indicates a signal purpose—for example the signal purpose may be a status check, or command.

The perhaps more important information is stored in (Data1, Data2, . . . , DataN), which are actual bytes of data relevant to the signal itself, there being N bytes of data, N being an integer greater than or equal to 1. This portion of the signal indicates, in the context of a status report, the actual status. In one case, Data1 is indicative of "note stacked", and Data2 is indicative of the denomination of the note that was stacked. This information is recognised and extracted through software 121 on the basis of signalling protocol information. In another case, In one case, Data1 is indicative of "note rejected", and Data2 is indicative of a rejection reason. Again, this information is recognised and extracted through software 121 on the basis of signalling protocol.

Information extracted by software 121 is used to update counters, and is in some cases immediately communicated to server 9.

The present embodiment is particularly designed with tampering considerations in mind. The underlying rationale is that a monitoring device along these lines, or associated software of one of these devices, could feasibly be modified or replaced in such a manner that it alters signals between validator 2 and CCU 4. In particular, signals indicative of note acceptance could be generated and provided to CCU 4 by a malicious user in absence of a note even being inserted. This malicious user would therefore obtain playing credit without purchasing this credit. There are also accounting and taxation concerns.

Device 120 makes use of two distinct tamper-evident systems. The first of these is a physical tamper system, provided by a tamper-evident casing 121. The second of these is tamper evident software 122. These are discussed in more detail below.

Figure 15:
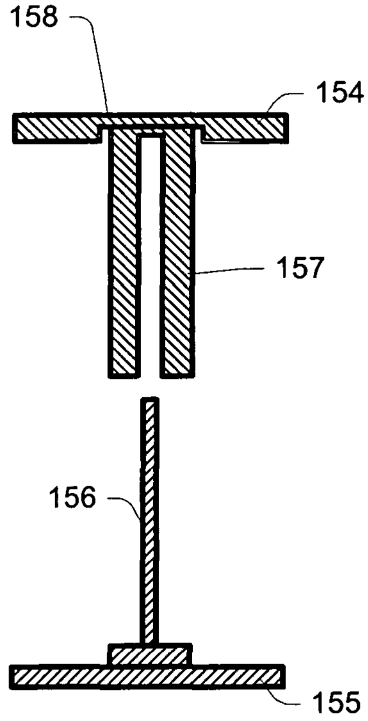
FIG. 15 is a sectional view of an attachment system used by the device of FIG. 10.

The underlying notion behind casing 121 is to provide a body for maintaining device 120 that, once closed, cannot be opened without providing a clear visual indication that it has been opened. Software 122 can only be accessed for modification or alteration when the casing is opened. In the present embodiment, casing 121 is defined by two casing halves 154 and 155 that are one-time snap-lockingly inter-engageable, as best shown in FIG. 15. In overview, a plurality of male members 156 on half 155 are captively received by corresponding female members 157 on half 154. This defines the snap locking engagement. The strength of captive engagement is sufficient such that the force required to remove members 156 from members 157 results in breakage of casing 121 prior to release of members 156. Typically, this involves breakage at regions 158, which removes members 157 from half 154, or general breakage of casing 121. In practice, this arrangement is achieved by selection of an appropriate plastics material for defining casing 121, often in conjunction with weakening of regions 158.

Software 122 provides a unique tamper evident software identifier that is remotely readable. For example: by a CRC check from server 9. In practice, such a CRC check is provided upon initiation of the monitoring device, at predetermined time intervals, and/or in response to a user command. Other possibilities are also considered. The general rationale is that the identifier changes upon any alteration or modification of software 122, and as such an external server is immediately able to recognise any such alteration or modification.

The net result is a monitoring device that is particularly tamper evident, which leads to reliability and security. This is particularly important in jurisdictions where EGMs are subject to independent regulation of EGM component specifications.

Circuit board 123 also includes three LEDs 160, which externally display the operation of device 120, and whether signals are being sent or received. These LEDs are visible through apertures 161.

In this embodiment, device 120 does not initiate commands for provision to CCU 4 or validator 2. That is, each signal provided by the device is identical to a signal received by the device. This takes into consideration regulatory requirements. In other embodiments the software 122 is enabled to provide signals in response to an external command. For example: a command to disable recognition of a particular denomination of note. This may be necessary if, for instance, there is a reason to suspect that counterfeit notes of that denomination are being used at a venue. This command is conveniently provided simultaneously to all machines in the venue. In prior art situations this would require validator interaction on a machine-by-machine basis, which is time consuming.

A further aspect of the invention is a method for providing information about a validator used by a terminal in situations where the validator is enabled for communication with the terminal through a communication line. The method includes monitoring signals in the communication line, compiling information indicative of monitored signals, and obtaining the information indicative of the monitored signal. Persons skilled in the art will be able to recognise and implement this method using alternate components. It will be noted that implementing the method using alternate devices is not beyond the scope of the present invention.

It will be appreciated that, as a result of installing a device or implementing a method according to various embodiments of the present invention, it is not necessary to interrupt the use of EGM 3 to obtain information about the operation of validator 2. The information is obtainable remotely by server 9 at the convenience of an administrator. In some embodiments, information is obtained in real-time. In other embodiments, the information is obtained sporadically or at predetermined times. Many embodiments of the present invention, particularly those where processor 7 includes a storage system, are able to accommodate either or both of real time and intermittent obtainment of information by server 9.

Although the present invention has been described with particular reference to certain preferred embodiments thereof, variations and modifications of the present invention can be effected within the spirit and scope of the invention.

The claims defining the invention are as follows:

1. A device for installation in a gaming machine, wherein the gaming machine includes a central control unit and a bill validator, and wherein the bill validator is configured to communicate with the central control unit via a data cable connected at one end to a data cable port of the bill validator at its other end to a data cable port of the central control unit, the device including:

a body that is configured to be connected by data cables intermediate a bill validator and the central control unit of a gaming machine, the body providing:

(i) a first data cable connection port for receiving a first data cable, such that the first data cable is connected at one end to the data cable port on the bill validator and at its other end to the first data cable connection port; and (ii) a second data cable connection port for receiving a second data cable, such that the second data cable is connected at one end to the data cable port of the central control unit and at its other end to the second data cable connection port;

a processor that is coupled to the first data connection port and to the second data connection port, thereby to isolate the validator from the central control unit, such that:

(i) signals provided by the validator via the first data cable are received by the processor, and selectively provided by the processor to the second data port for transmission to the central control unit via the second data cable; and (ii) signals provided by the central control unit via the second data cable are received by the processor, and selectively provided by the processor to the first data port for transmission to the validator via the first data cable; and a further a communications port coupled to the processor, the further communications port being configured to communicate with one or more components external of the gaming machine;

wherein the processor is configured to:

(i) pass signals between the first connector port and the second connector port such that those signals are delivered from the validator to the central control unit, or from the central control unit to the validator, via the processor; and (ii) monitor the passed signals, and, based on that monitoring, compile information in response to the passed signals, and communicate the compiled information externally of the terminal via the further communications port.

2. The device of claim 1 wherein the processor is additionally configured to provide a signal to the validator or the central control unit in response to a signal received from an external component via the further communication port.

3. The device of claim 1 wherein the compiled information is indicative of only a predetermined subset of the passed signals.

4. The device of claim 1 wherein the signals passed between the first connector port and the second connector port, such that those signals are delivered from the validator to the central control unit, include any one or more of the following:

a validator identifier;

a note acceptance identifier;

a note rejection identifier;

a rejection type identifier;

a note denomination identifier;

a note identifier; and a validator error identifier.

5. The device of claim 1 wherein including a storage system for storing the compiled information, wherein the further communications port facilitates external querying of the storage system.

6. The device of claim 1 wherein the compiled information is indicative of any one or more of the following:

a digital representation of a transmitted signal;

an identifier indicative of the device;

an identifier indicative of the terminal;

an identifier indicative of the validator; and a tag indicative of the time a signal was monitored.

* * * * *